United States Patent [19]

Pflug et al.

[11] Patent Number: 5,049,191
[45] Date of Patent: Sep. 17, 1991

[54] NOVEL FRICTION MATERIAL

[75] Inventors: Detlef U. Pflug, Oskar-Wachtel-Wen; Wilfried Koch, Pützweg; Armin Eckert, Mittelkamp, all of Fed. Rep. of Germany

[73] Assignee: Rutgerswerke AG, Fed. Rep. of Germany

[21] Appl. No.: 494,160

[22] Filed: Mar. 15, 1990

[30] Foreign Application Priority Data

Apr. 27, 1989 [DE] Fed. Rep. of Germany ....... 3913952
Aug. 30, 1989 [DE] Fed. Rep. of Germany ....... 3928703

[51] Int. Cl.$^5$ .................................................. C09K 314
[52] U.S. Cl. ..................................................... 106/36
[58] Field of Search .................. 106/36; 523/155, 156

[56] References Cited

FOREIGN PATENT DOCUMENTS 8029848  4/1981  Japan ................................. 523/15 S
61-186600  8/1986  Japan ..................................... 106/36
61-191599  8/1986  Japan ..................................... 106/36

OTHER PUBLICATIONS

Research Disclosure, Mar. 1981, 51681 0028 No. 203, Disclosed by Imperial Chemical Industries Ltd.

Primary Examiner—William R. Dixon, Jr.
Assistant Examiner—M. Einsmann
Attorney, Agent, or Firm—Bierman and Muserlian

[57] ABSTRACT

An asbestos-free friction material for brake linings and clutches comprising at least one binder and a reinforcing material, at least a portion of the reinforcing material being sepiolite in the form of short fibers.

2 Claims, No Drawings

NOVEL FRICTION MATERIAL

STATE OF THE ART

Asbestos-free friction materials for brakes and clutches consisting essentially of a binder or binder mixture and reinforcing material, the reinforcing material being a mixture of aramide fibers, mineral fibers and steel fibers are known. Friction materials for brakes and clutches are often still being made even now using asbestos fibers as a reinforcement component. Because of the toxic, probably even cancerogenic properties of asbestos fibers and the foreseeable scarcity of the raw material asbestos, it is necessary to replace these fibers by other materials.

It has been possible to replace asbestos in friction linings with other reinforcing materials such as fibers of mineral, ceramic, glass, or organics, but usually the physical properties of the asbestos linings were not matched. On the other hand, the industry's requirements for friction linings with respect to thermal and mechanical strength, wear resistance, brake deceleration and stability of the deceleration at increasing temperature of the drum and at increasing speed became ever more stringent, that is, there is a need for friction linings which are qualitatively superior to asbestos linings.

By selecting certain fibers, friction linings were developed which showed great improvements in specific properties. Thus, for example, in European Pat. No. 0,050,377, the use of fibers based on aramide as reinforcement material resulted in much better values for lining wear and drum wear. However, the properties of the asbestos-containing friction materials are not obtained over the entire quality profile.

OBJECTS OF THE INVENTION

It is an object of the invention to provide asbestos-free friction material to produce friction linings with an overall quality profile at least equal to asbestos-containing materials.

This and other objects and advantages of the invention will become obvious from the following detailed description.

THE INVENTION

The material of the invention is an asbestos-free friction material for brake linings and clutches comprising at least one binder and a reinforcing material, at least a portion of the reinforcing material being sepiolite in the form of short fibers. The use of sepiolite which is a hydrated magnesium silicate in the form of short fibers in friction lining materials gives equal or better properties as asbestos-containing lining materials.

Sepiolite is a silicatic, natural mineral with a fiber type habit and it can be produced in the form of short fibers, i.e. with fiber lengths up to 15 mm. Heretofore, such fibers have been used as an absorption medium or a carrier material for catalysts. These sepiolite short-staple fibers are suitable, surprisingly, as reinforcement material in friction material, yeilding good brake values as well as improving the form stability of the friction material mixtures e.g. in shaping or cold pressing. In addition, the tendency of segregation of the physically very different raw materials of a friction lining composition is great reduced. Shaping and pressing is simplified by the good stabilization of the mixture combined with low bulk weight. Such compositions can be pressed either cold or hot.

Sepiolite can be employed alone or together with other reinforcing friction materials, a total of 5 to 70% by weight of reinforcing material being used in the lining material and the content of sepiolite ranging from 1. to 50% by weight referred to the total mixture. The other components of the friction materials are 5 to 25% by weight of curing binders or binder mixtures, particularly phenolic resins as well as further additives. Preferred further additives are graphite, alumina, and other friction supporters known per se which increase particularly the coefficient of friction at elevated temperatures.

In the following example there are described several preferred embodiments to illustrate the invention. However, it is to be understood that the invention is not intended to be limited to the specific embodiments.

EXAMPLE

A friction-lining material comprising 15% by weight of a 10:1 mixture of phenolic resin and hexamethylene tetramine, 20% by weight of graphite, 5% by weight of alumina, 25% by weight of heavy spar, 15% by weight of brass shavings and 20% by weight of fibers. The fibers used in the tests were one of the following:

1. 100% asbestos fiber,
2. 70% diabase fiber, 30% aramide fiber,
3. 100% sepiolite
4. 50% sepiolite, 35% diabase fiber, 15% aramide fiber.

The friction lining materials obtained and the friction elements were produced therefrom by the usual methods and were evaluated according to the following criteria:

Form stability of the blank (before hardening): Evaluation by a fabricator specialist.

Machining of the hardened blank: Evaluation by a fabricator specialist.

Service value: Mean of 24 measurements under various conditions (Krauss test bench).

Constantance of coefficient of friction in the temperature range 50° to 300° C.

Lining wear: Wear after practical trial.

Disk wear: Wear after practical trial.

The following results were obtained:

| | SAMPLE NO. | | | |
|---|---|---|---|---|
| | (1) | (2) | (3) | (4) |
| Form stability of blank | good | satisfactory | good | good to very good |
| Machining | good | satisfactory | good | good |
| Service coeff. of friction | 0.40 | 0.42 | 0.38 | 0.40 |
| Constance of coeff. of friction over temperature | satisfactory | | good | good |
| Lining wear | satisfactory | good | good to very good | good |
| Disk wear | satisfactory | satisfactory to good | good | good |

It can be concluded from the data of the above Table that the linings of the invention were as good as or superior to the asbestos containing linings.

Various modifications of the invention may be made without departing from the spirit or scope thereof and it should be understood that the invention is intended to be limited only as defined in the appended claims.

What we claim is:

1. An asbestos-free friction material for brake linings and clutches consisting essentially of 5 to 25% by weight of a binder material and ≡to 70% by weight of reinforcing material and other additives selected from the group consisting of graphite, alumina, heavy spar and brass shavings, the reinforcing material containing 1.5 to 50% by weight of the composition of sepiolite short fibers.

2. A friction material of claim 1 wherein sepiolite is the only reinforcing material.

* * * * *

UNITED STATES PATENT AND TRADEMARK OFFICE
CERTIFICATE OF CORRECTION

PATENT NO. : 5,049,191

DATED : Sept. 17, 1991

INVENTOR(S) : Detlef U. Pflug; Wilfried Koch and Armin Eckert

It is certified that error appears in the above-identified patent and that said Letters Patent is hereby corrected as shown below:

| Col. | Line | | |
|------|------|------|------|
| 3 | 6 | "≅ to 70%" | should be --5 to 70%-- |

Signed and Sealed this

Ninth Day of February, 1993

*Attest:*

STEPHEN G. KUNIN

*Attesting Officer*      *Acting Commissioner of Patents and Trademarks*